(12) United States Patent
Wang et al.

(10) Patent No.: US 11,798,118 B2
(45) Date of Patent: Oct. 24, 2023

(54) ASSET CACHING IN CLOUD RENDERING COMPUTING ARCHITECTURES

(71) Applicant: Intel Corporation, Santa Clara, CA (US)

(72) Inventors: Changliang Wang, Bellevue, WA (US); Mohammad R. Haghighat, San Jose, CA (US); Yong Yao, Cupertino, CA (US); Xiaocheng Mao, Shanghai (CN); Yifei Xue, Shanghai (CN); Bin Yang, Shanghai (CN); Jia Bao, Shanghai (CN); Raul Diaz, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/057,484

(22) PCT Filed: Dec. 20, 2019

(86) PCT No.: PCT/CN2019/126852
§ 371 (c)(1),
(2) Date: Nov. 20, 2020

(87) PCT Pub. No.: WO2021/120141
PCT Pub. Date: Jun. 24, 2021

(65) Prior Publication Data
US 2022/0318943 A1    Oct. 6, 2022

(51) Int. Cl.
*G06T 1/20*    (2006.01)

(52) U.S. Cl.
CPC ...................... *G06T 1/20* (2013.01)

(58) Field of Classification Search
CPC .......... G06T 1/20; G06F 9/452; A63F 13/355; A63F 13/52; A63F 2300/5593;
(Continued)

(56) References Cited

U.S. PATENT DOCUMENTS

| 10,181,173 B1* | 1/2019 | Wilt ................... G06F 9/45558 |
| 2011/0084965 A1* | 4/2011 | Gould ................... G06T 15/005 345/426 |

(Continued)

FOREIGN PATENT DOCUMENTS

| WO | 2016187033 A1 | 11/2016 |
| WO | 2018125295 A1 | 7/2018 |

(Continued)

OTHER PUBLICATIONS

International Search Report and Written Opinion for International Patent Application No. PCT/CN2019/126852, dated Sep. 24, 2020, 5 pages.

*Primary Examiner* — Jacinta M Crawford
(74) *Attorney, Agent, or Firm* — Jordan IP Law, LLC

(57) ABSTRACT

Systems, apparatuses and methods may provide for technology that sends a first message via an input output (IO) link, wherein the first message includes a first rendering asset and an identifier (ID) associated with the first rendering asset. The technology may also exclude a second rendering asset from a second message in response to the ID being shared by the first rendering asset and the second rendering asset and send the second message via the IO link, wherein the second message includes the ID. In one example, the ID is a hash ID.

24 Claims, 10 Drawing Sheets

(58) Field of Classification Search
CPC ....... H04N 21/21805; H04N 21/23103; H04N 21/23106; H04N 21/23412
USPC .................................... 345/501, 502, 505
See application file for complete search history.

(56) References Cited

U.S. PATENT DOCUMENTS

| | | |
|---|---|---|
| 2012/0198318 A1 | 8/2012 | Graves et al. |
| 2014/0267339 A1* | 9/2014 | Dowd .................. G06F 9/543 |
| | | 709/219 |
| 2014/0354657 A1* | 12/2014 | Gomba ................. G06T 19/00 |
| | | 345/522 |
| 2017/0050110 A1* | 2/2017 | Perry ..................... A63F 13/30 |
| 2017/0229102 A1* | 8/2017 | Shewman .............. G09G 5/377 |
| 2019/0222648 A1 | 7/2019 | Huifeng et al. |
| 2019/0308099 A1* | 10/2019 | Lalonde ................ A63F 13/352 |
| 2020/0204436 A1* | 6/2020 | Brown ................ G07F 17/3293 |

FOREIGN PATENT DOCUMENTS

| | | |
|---|---|---|
| WO | 2019169913 A1 | 9/2019 |
| WO | 2019199848 A1 | 10/2019 |

\* cited by examiner

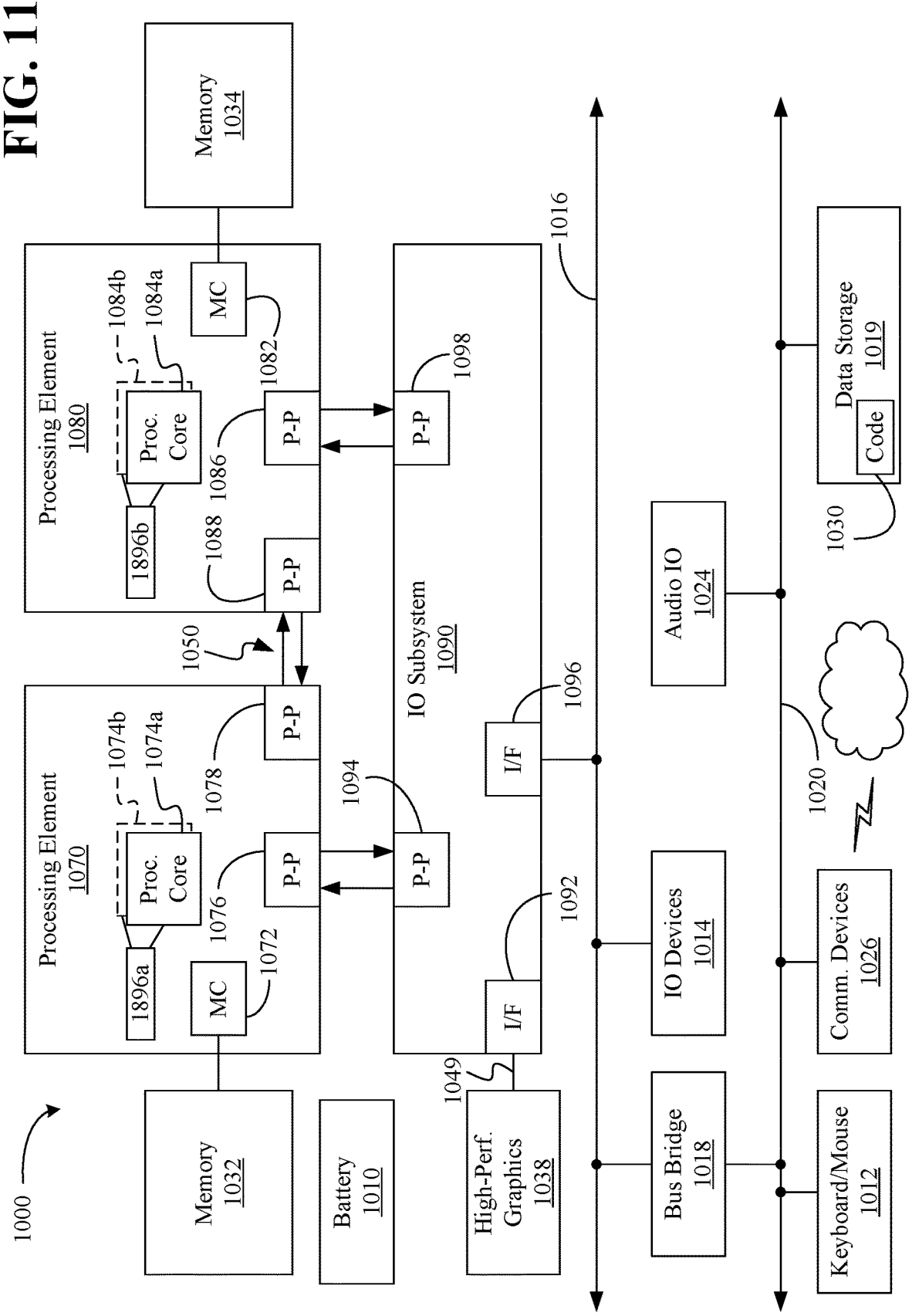

US 11,798,118 B2

ASSET CACHING IN CLOUD RENDERING COMPUTING ARCHITECTURES

CROSS REFERENCE TO RELATED APPLICATIONS

The present application is a U.S. National Phase Patent Application, which claims the benefit of priority to International Patent Application No. PCT/CN2019/126852 filed on Dec. 20, 2019.

TECHNICAL FIELD

Embodiments generally relate to cloud computing. More particularly, embodiments relate to rendering asset caching in cloud rendering architectures.

BACKGROUND

Video streaming applications may execute on a CPU (central processing unit) of a cloud server, which offloads the rendering and encoding of graphics commands to a pool of GPU (graphics processing unit) resources. In some computing architectures, the pool of GPU resources is not co-located with the CPU of the cloud server. In such a case, an increase in data transmission latency, CPU usage (e.g., due to network protocol packaging and/or de-packaging), and/or bandwidth consumption may be experienced. These challenges may be particularly pronounced when there are several instances of the video streaming application running on the cloud server.

BRIEF DESCRIPTION OF THE DRAWINGS

The various advantages of the embodiments will become apparent to one skilled in the art by reading the following specification and appended claims, and by referencing the following drawings, in which:

FIG. 11 is a block diagram of an example of a multi-processor based computing system according to an embodiment.

DESCRIPTION OF EMBODIMENTS

Figure 1:
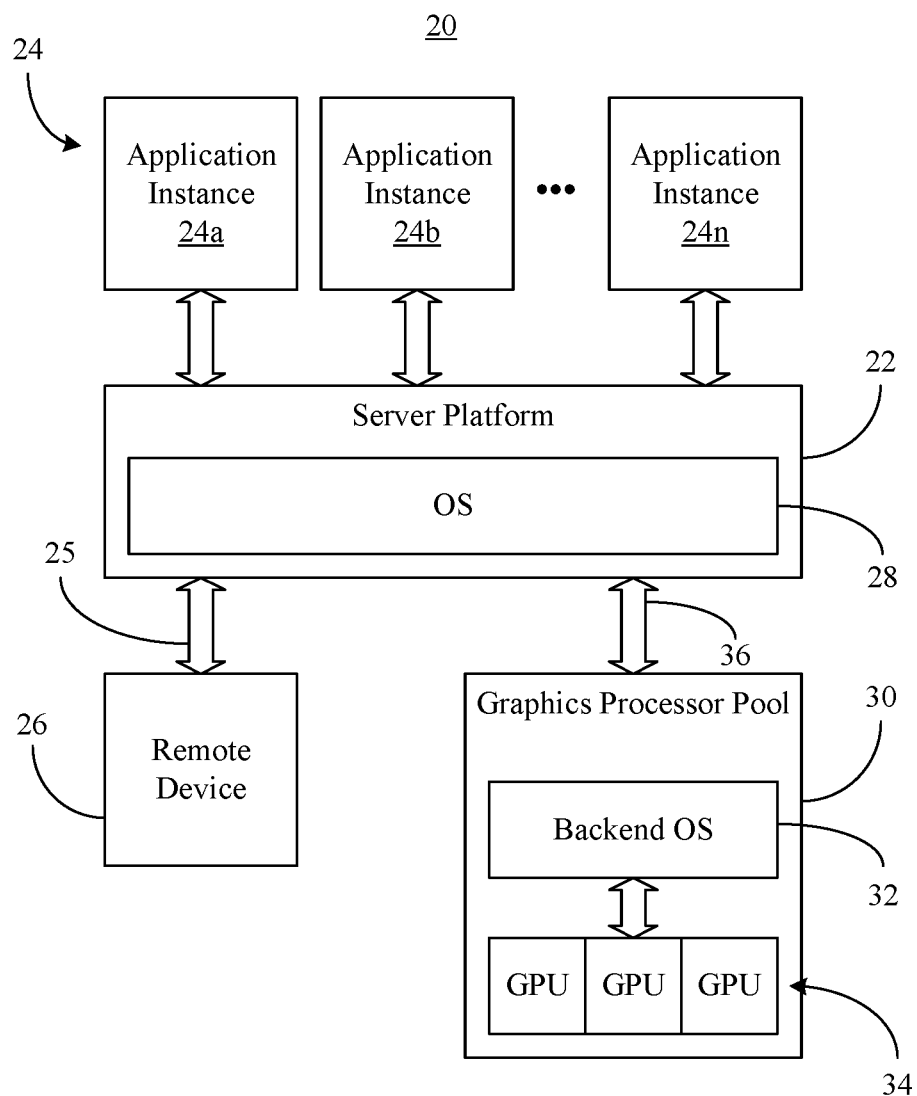
FIG. 1 is a block diagram of an example of a cloud rendering architecture according to an embodiment.

Turning now to FIG. 1, a cloud rendering architecture 20 is shown in which a server platform 22 executes a plurality of application instances 24 (24a-24n, e.g., cloud game sessions, virtual desktop instances, etc.). Executing a relatively large number of the application instances 24 on the server platform 22 generally reduces the total cost of ownership (TCO) of the platform 22. In an embodiment, one or more of the application instances 24 involve the rendering and delivery of duplicate or similar graphics textures, vertex buffers, shader program buffers, and/or other rendering assets to a remote device 26 (e.g., smartphone, notebook computer, desktop computer, game console or other client device) over a connection 25 such as, for example, a public Internet connection. In one example, each texture is a digital representation of the surface of an object and may include two-dimensional (2D) attributes such as color and brightness, as well as three-dimensional (3D) attributes such as transparency and reflectiveness. A texture may therefore be a form of data object containing one or more images that enable a graphics processor to compute or render a visual scene. Moreover, a buffer may contain stored textures.

In the illustrated example, an operating system (OS, game engine or other runtime management component) 28 of the server platform 22 offloads the rendering and encoding of graphics commands associated with the rendering assets to a remote graphics processor pool 30 (e.g., in a remote rendering mode). The graphics processor pool 30 may include a backend OS 32 that selectively dispatches the graphics tasks to a plurality of graphics processing units (GPUs, e.g., graphics processors) 34. The illustrated architecture 20 enables a relatively high number of the application instances 24 to be supported. In an embodiment, the graphics processor pool 30 is not co-located with the server platform 22. Rather, the illustrated server platform 22 uses an input output (IO) link 36 (e.g., via a high speed network) to communicate with the graphics processor pool 30. As will be discussed in greater detail, the illustrated server platform 22 and the graphics processor pool 30 engage in rendering asset (e.g., graphics textures, vertex buffers, shader program buffers, and/or other buffers to fulfill a cloud rendering task) caching to reduce data transmission latency, CPU usage (e.g., due to network protocol packaging and/or de-packaging), and/or bandwidth consumption. Additionally, the use of a plurality of GPUs 34 along with a unified application programming interface (API) may eliminate any need to conduct modifications to the GPU firmware.

Figure 2:
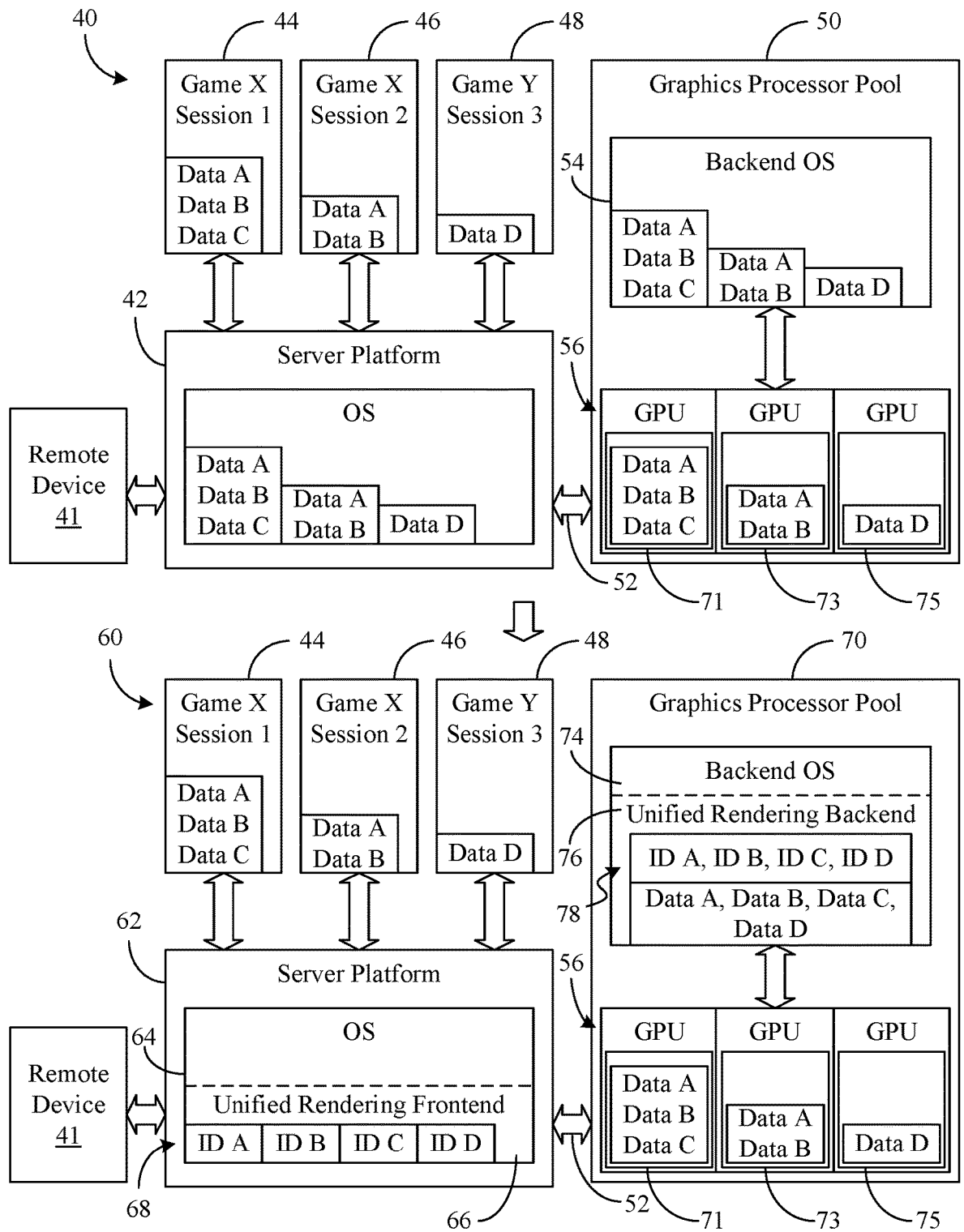
FIG. 2 is a comparative block diagram of an example of a conventional cloud rendering architecture and an enhanced cloud rendering architecture according to an embodiment.

FIG. 2 shows a conventional cloud rendering architecture 40 in which a server platform 42 executes a first session 44 ("Session 1", e.g., first instance) of a first game ("Game X"), a second session 46 ("Session 2", e.g., second instance) of the first game, and a third session 48 ("Session 3", e.g., third instance) of a second game ("Game Y"). In the illustrated example, execution of the first session 44 results in the generation of Data A, Data B, and Data C (e.g., graphics commands and/or assets). Additionally, because both the first session 44 and the second session 46 involve the same game (Game X), execution of the second session 46 may result in the generation of the same Data A and Data B (e.g., corresponding to a similar scene in the game). By contrast, because the third session 48 involves a different game (Game Y), execution of the third session 48 might result in the generation of different data (Data D).

In the illustrated example, the data that is captured by the server platform 42 and sent to a graphics processor pool 50 over an IO link 52 includes duplicate/redundant data (Data A, Data B). A backend OS 54 of the graphics processor pool 50 may store the data in host memory and dispatch the data to a plurality of GPUs 56 for rendering and encoding. In the illustrated example, the GPUs 56 include GPU memory 71, 73, 75 to store the data during rendering and encoding. As already noted, sending the redundant data over the IO link 52 may increase data transmission latency, CPU usage (e.g., due to network protocol packaging and/or de-packaging), and/or bandwidth consumption, particularly when the number of sessions 44, 46, 48 is relatively high.

By contrast, an enhanced cloud rendering architecture 60 includes a server platform 62 having an OS 64 with a unified rendering frontend 66. In an embodiment, the unified rendering frontend 66 maintains a listing 68 of unique identifiers (IDs, e.g., "ID A", "ID B", "ID C", "ID D") corresponding to the data generated as a result of execution of the sessions 44, 46, 48. Additionally, a backend OS 74 of a graphics processor pool 70 includes a unified rendering backend OS 76, which may cache the data generated as a result of the execution of the sessions 44, 46, 48 and maintain a listing 78 of the unique IDs corresponding to the cached data. The illustrated backend OS 74 dispatches the cached data to the plurality of GPUs 56 for rendering and encoding. In the illustrated example, the GPUs 56 include GPU memory 71, 73, 75 to store the data during rendering and encoding.

In an embodiment, the cloud game scheduler collects information about the running game instances. The information may include, for example, game type, game player, game status, game stage, game scene, and so forth. Additionally, the information may be uploaded to a game schedule server (not shown). In one example, the game schedule server schedules all game instances that have the same game type, stage, and scene into the same server platform 62. Moreover, geographic information of every game instance may also be considered to avoid increasing latency between game instances on the server platform 62 and a client on a remote device 41.

Maintaining the listings 68, 78 and caching the data in the unified rendering backend 76 may significantly reduce data transmission latency, CPU usage (e.g., due to network protocol packaging and/or de-packaging), and/or bandwidth consumption, particularly when the number of sessions 44, 46, 48 is relatively high. Indeed, it has been determined that a significant portion (e.g., 70% or more) of the data transferred during execution of a video streaming application is related to textures and other rendering assets. Moreover, it is common for a small subset of games (e.g., the most popular) games to be played by a large number of players. Accordingly, the amount of redundant rendering assets being offloaded to the graphics processor pool 70 for rendering and encoding may be substantial.

Figure 3:
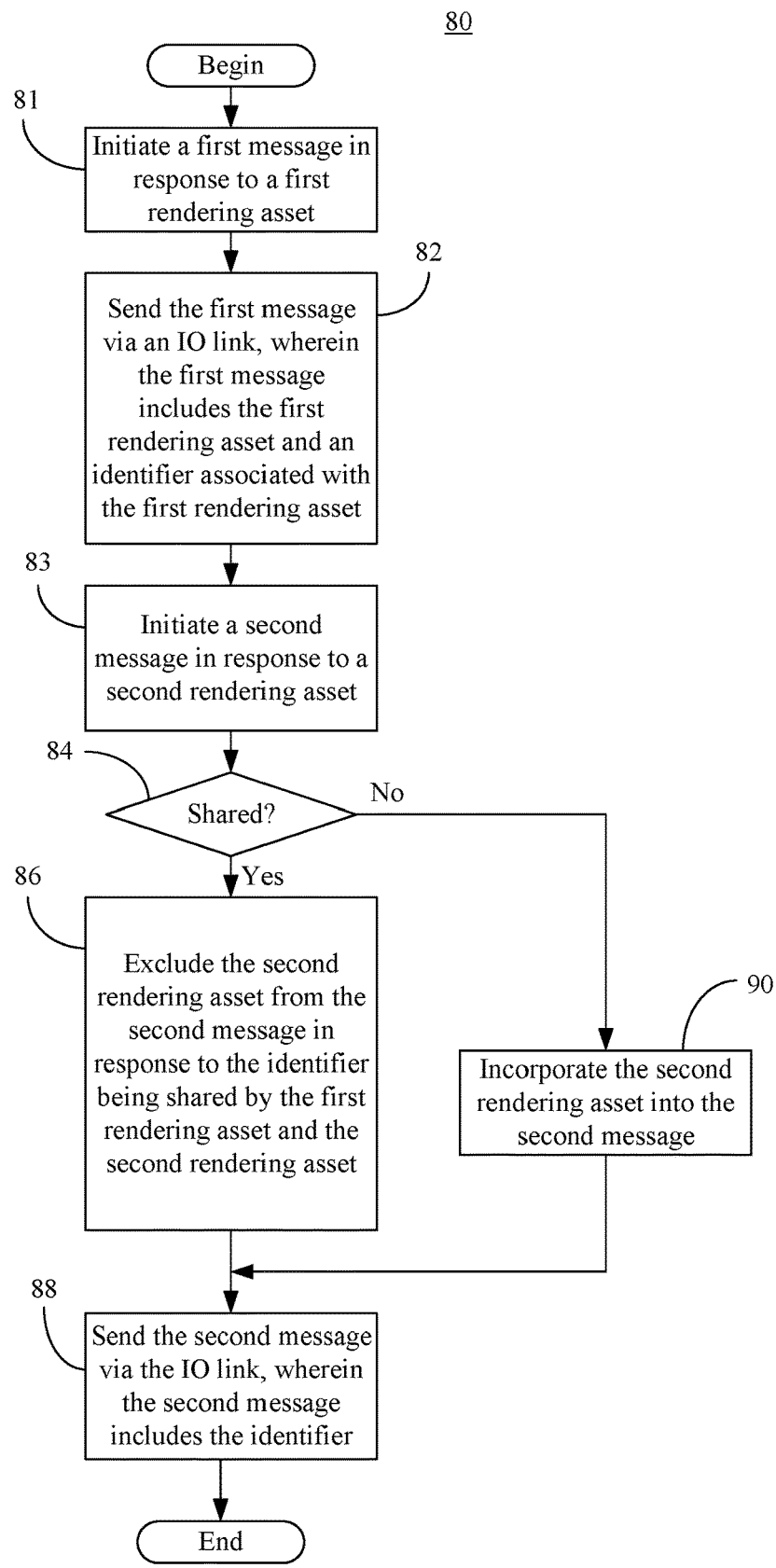
FIG. 3 is a flowchart of an example of a method of operating a performance-enhanced computing system according to an embodiment.

FIG. 3 shows a method 80 of operating a performance-enhanced computing system. The method 80 may generally be implemented in a server platform such as, for example, the server platform 22 (FIG. 1) and/or the server platform 62 (FIG. 2). More particularly, the method 80 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 81 provides for initiating a first message in response to a first rendering asset, wherein the first rendering asset may include a texture, a buffer, and so forth. Block 82 sends the first message via an IO link, wherein the first message includes the first rendering asset and an identifier (ID) associated with the first rendering asset. As will be discussed in greater detail, the ID may be obtained by applying a hash function (e.g., Message-Digest MD5 procedure, Secure Hash Algorithm 1/SHA-1 procedure) to content of the first rendering asset, extracting the ID from a first application call (e.g., OPENGL extension) associated with the first rendering asset, and so forth. Block 83 initiates a second message in response to a second rendering asset (e.g., texture, buffer, etc.).

A determination may be made at block 84 as to whether the ID is shared by the first rendering asset and the second rendering asset. In an embodiment, block 84 includes applying a hash function (e.g., MD5, SHA-1) to content of the second rendering asset, extracting an ID from a second application call associated with the second rendering asset, and so forth. If the ID is shared by the first rendering asset and the second rendering asset, illustrated block 86 excludes the second rendering asset from the second message in response to the ID being shared by the first rendering asset and the second rendering asset. The second message may be sent via the IO link at block 88, wherein the second message includes the ID. If it is determined at block 84 that the ID is not shared by the first rendering asset and the second rendering asset, block 90 may incorporate the second rendering asset into the second message. Thus, each rendering asset is sent over the IO link only once in the illustrated example.

In an embodiment, the first message and the second message are sent to a remote graphics processor pool via the IO link. Additionally, the first rendering asset may correspond to a first instance of a graphics (e.g., game, virtual desktop) application and the second rendering asset may correspond to a second instance of the graphics application. Excluding the second rendering asset from the second message eliminates the transmission of redundant data over the IO link and therefore reduces data transmission latency, CPU usage, and/or bandwidth consumption. While two messages and rendering assets are described to facilitate discussion, the number of messages and rendering assets may be much greater depending on the circumstances.

Figure 4:
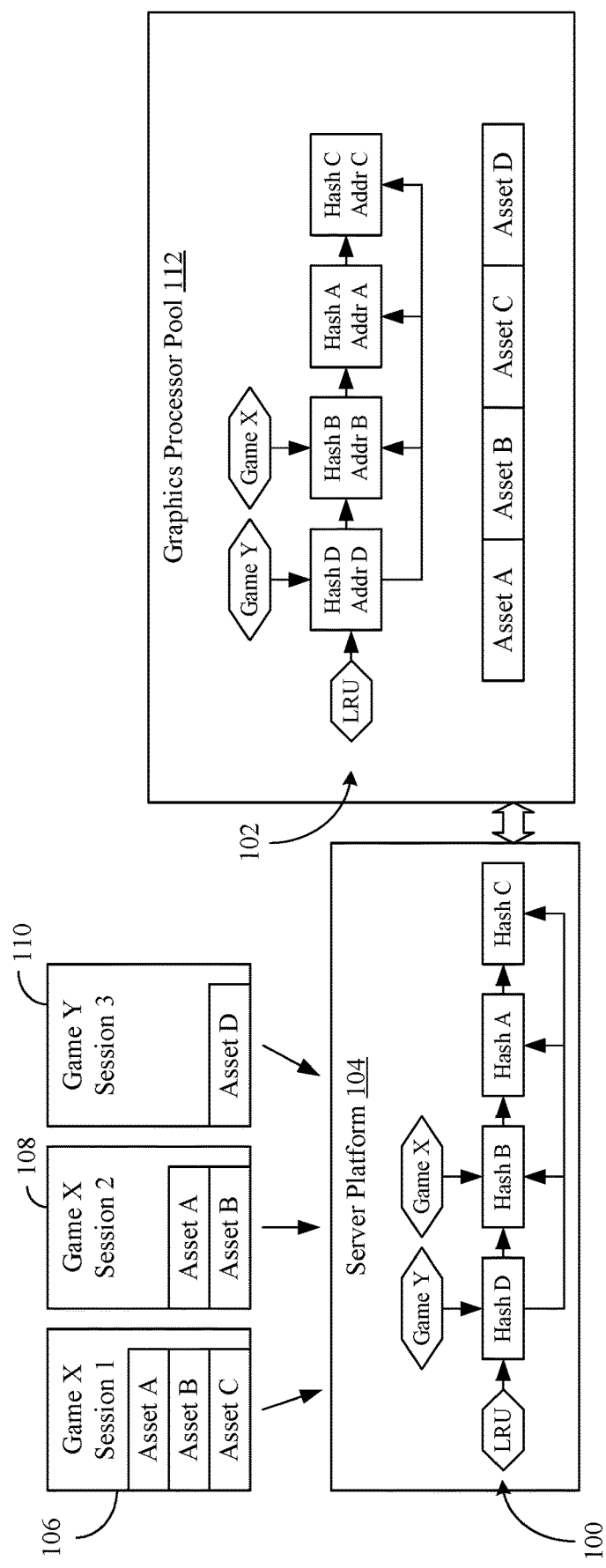
FIG. 4 is a block diagram of an example of a hash buffer and a caching buffer layout according to an embodiment.

Turning now to FIG. 4, a hash buffer layout 100 and a caching buffer layout 102 are shown. In the illustrated example, a server platform 104 executes a first session 106 ("Session 1", e.g., first instance) of a first game ("Game X"), a second session 108 ("Session 2", e.g., second instance) of the first game, and a third session 110 ("Session 3", e.g., third instance) of a second game ("Game Y"). In the illustrated example, execution of the first session 44 results in the generation of "Asset A," "Asset B," and "Asset C" (e.g., graphics textures). Additionally, because both the first session 106 and the second session 108 involve the same game (Game X), execution of the second session 108 may result in the generation of the same Asset A and B (e.g., corresponding to a similar scene in the game). By contrast, because the third session 110 involves a different game (Game Y), execution of the third session 110 might result in the generation of different asset ("Asset D").

In the illustrated example, the hash buffer layout 100 includes a least recently used (LRU) data structure and linked lists for each type of game (e.g., Game X, Game Y) to store hash IDs (e.g., minimizing the likelihood of hash ID collisions). The caching buffer layout 102 is maintained in a graphics processor pool 112 and may also include a LRU data structure and linked lists, where the lists associate the hash IDs with the addresses of the cached asset data.

Figure 5:
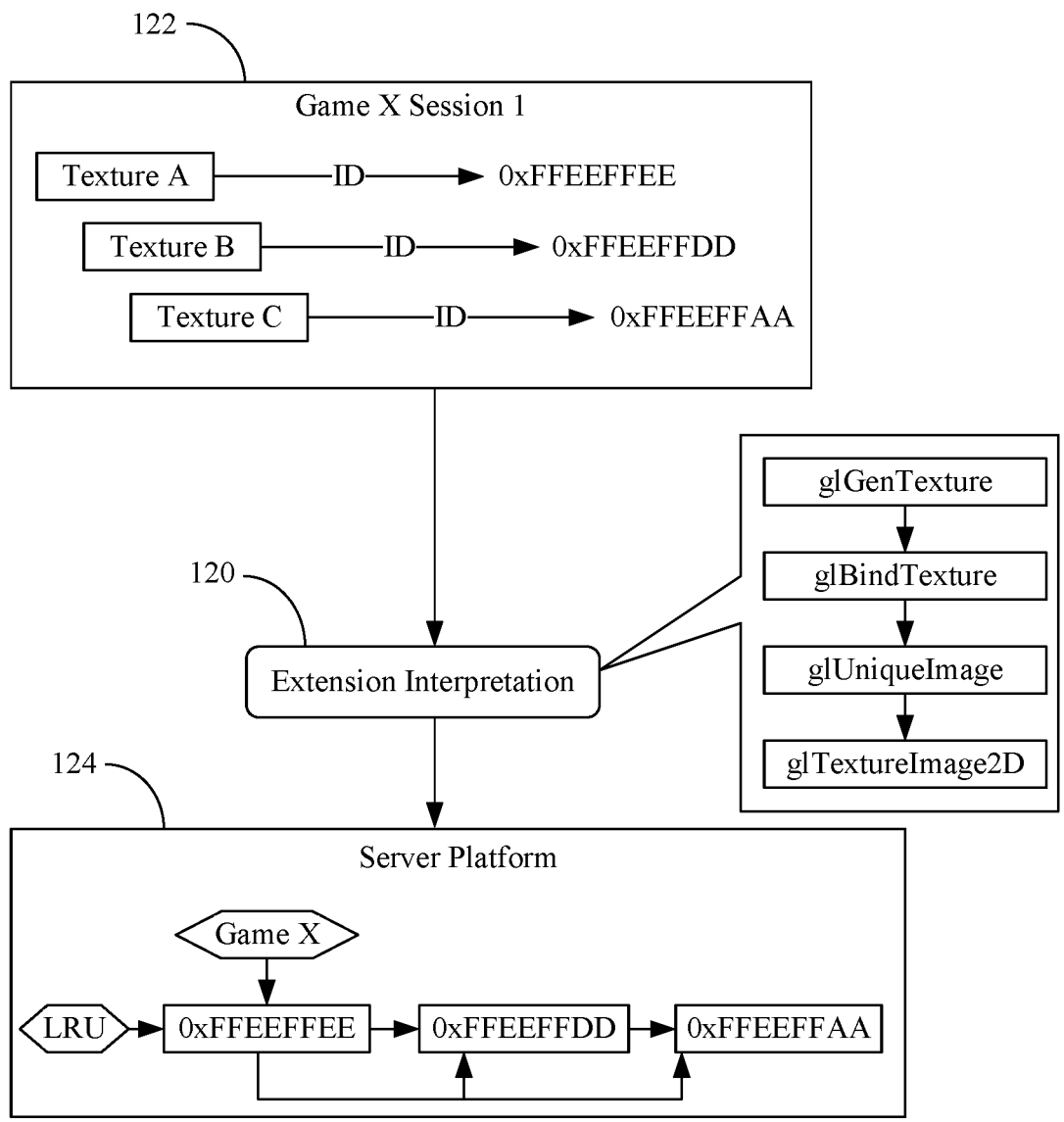
FIG. 5 is a block diagram of an example of an extension interpretation according to an embodiment.

FIG. 5 shows an extension interpretation 120 in which a driver (e.g., frontend driver layer) uses an application call (e.g., glUniqueID OPENGL call extension) to detect that a session 122 of a game has assigned a unique ID for a rendering asset. For illustration purposes, the texture asset uploading call procedure is given as an example to explain how the application call extension is adopted. By interpreting the application call, a server platform 124 is able to automatically determine the pre-calculated ID. Similar extensions may be provided in other graphics languages such as, for example, VULKAN. In an embodiment, the hash ID is encoded with game name and/or scene information. Such an application call extension is one way to obtain a unique ID for a rendering asset. As already noted, applying a hash function (e.g., MD5, SHA-1) to an image content is an alternative way to obtain the unique ID.

Figure 6A:
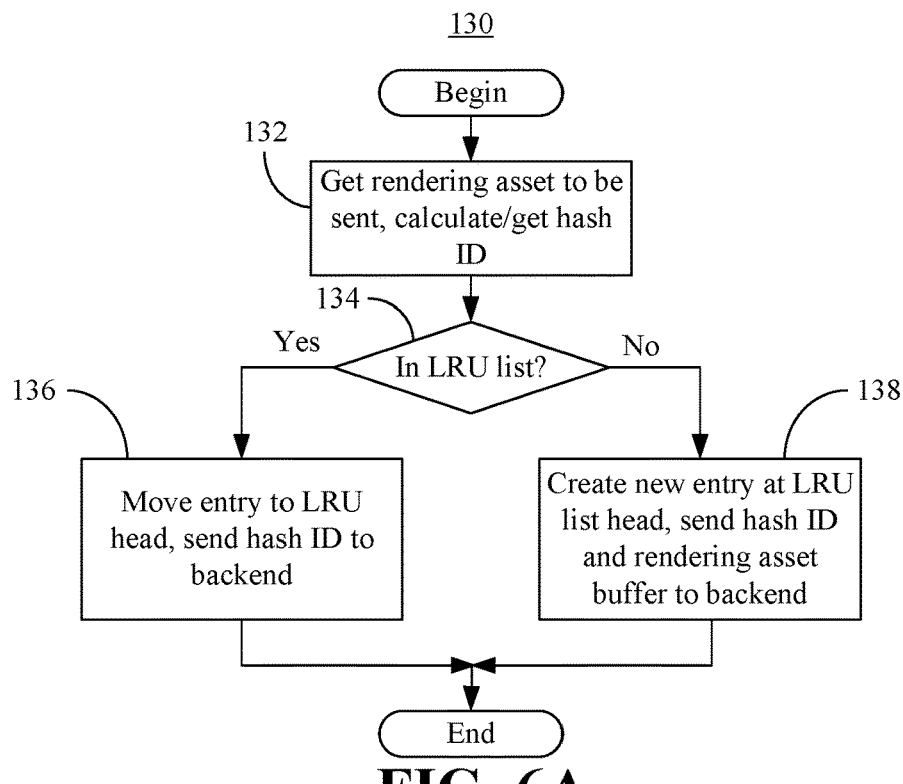
FIG. 6A is a block diagram of an example of a method of operating a unified rendering frontend according to an embodiment.

FIG. 6A shows a method 130 of operating a unified (e.g., ONEAPI) rendering frontend. The method 130 may generally be implemented in a frontend such as, for example, the unified rendering frontend 66 (FIG. 2), already discussed. More particularly, the method 130 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 132 gets a rendering asset to be sent and obtains (e.g., calculates, gets) a hash ID for the rendering asset. A determination may be made at block 134 as to whether the hash ID is present in an LRU list. In an embodiment, block 134 includes searching, in response to receipt of the rendering asset, an LRU data structure for the hash ID to determine whether the hash ID is shared by the rendering asset and a previously processed rendering asset. If so, block 136 moves the hash ID entry to the head of the LRU data structure. Illustrated block 136 also sends the hash ID (e.g., without the rendering asset buffer) to the backend. If it is determined at block 134 that the hash ID is not in the LRU data structure, block 138 may create a new entry at the head of the LRU data structure and send the hash ID and rendering asset buffer to the backend.

Figure 6B:
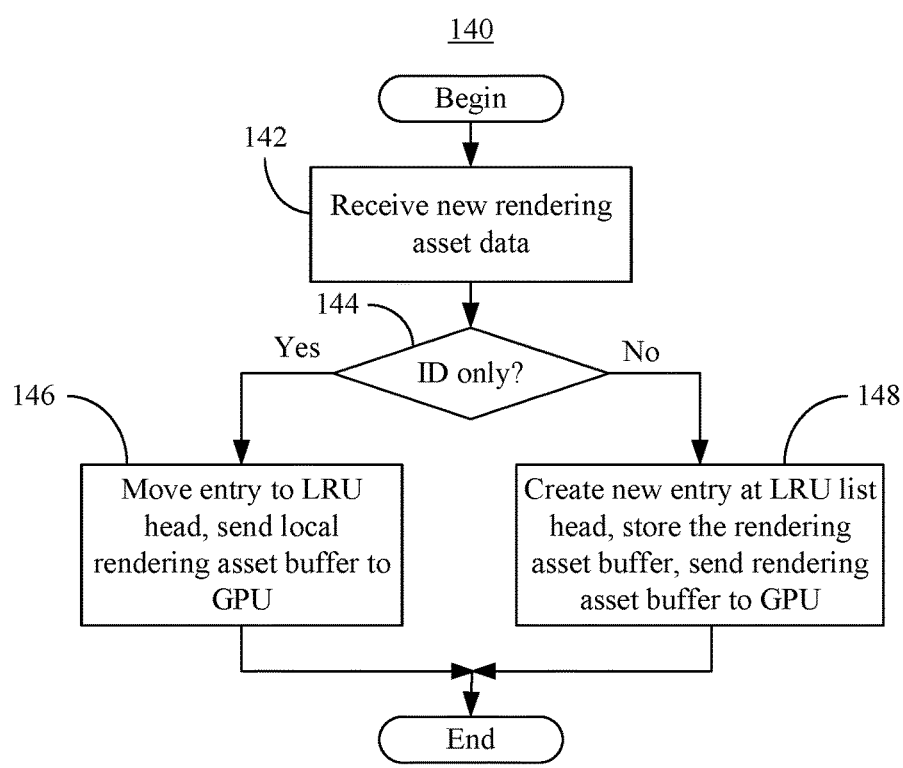
FIG. 6B is a block diagram of an example of a method of operating a unified rendering backend according to an embodiment.

FIG. 6B shows a method 140 of operating a unified (e.g., ONEAPI) rendering backend. The method 140 may generally be implemented in a backend such as, for example, the unified rendering backend 76 (FIG. 2), already discussed. More particularly, the method 140 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 142 provides for receiving new rendering asset data (e.g., a message from a unified rendering frontend via an IO link). In an embodiment, block 144 determines whether the new rendering asset data contains an ID only (e.g., does not contain a rendering asset buffer). If so, block 146 moves the ID as an entry to the head of an LRU data structure and sends the local rendering asset buffer to a GPU. Otherwise, block 148 may create a new entry at the head of the LRU data structure, store the rendering asset buffer, and send the rendering asset buffer to the GPU.

Figure 7A:
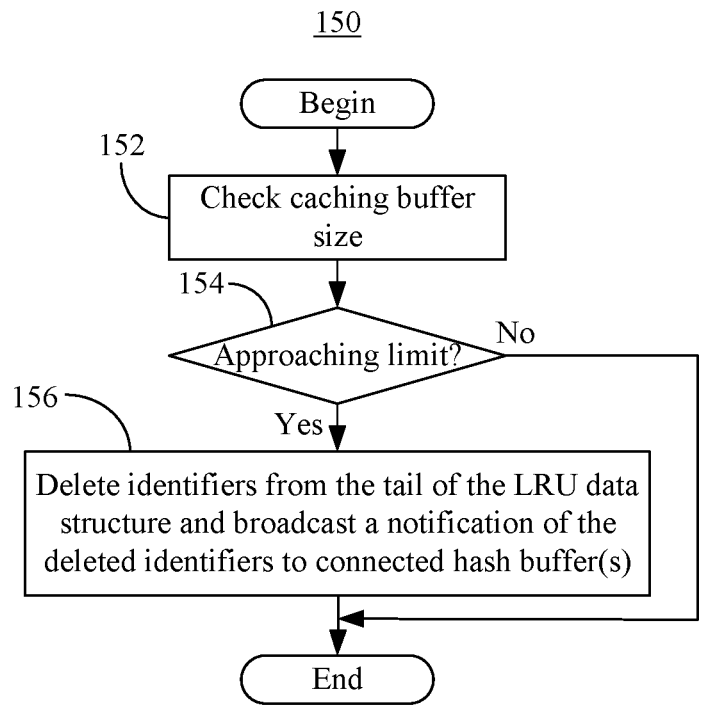
FIG. 7A is a flowchart of an example of a method of reclaiming memory in a unified rendering backend according to an embodiment.

FIG. 7A shows a method 150 of reclaiming memory in a unified rendering backend. The method 150 may generally be implemented in a backend such as, for example, the unified rendering backend 76 (FIG. 2), already discussed. More particularly, the method 150 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 152 checks the size (e.g., RAM resource usage) of the caching buffer. A determination may be made at block 154 as to whether the resource usage of the caching buffer is approaching a limit (e.g., has exceeded an overflow warning threshold). If so, block 156 deletes one or more identifiers from the tail of the LRU data structure. Block 156 may also broadcast a notification of the deleted identifiers to one or more connected hash buffers. In this regard, the graphics processor pool may support more than one server platform. If it is determined at block 154 that the resource usage of the caching buffer is not approaching the limit, the illustrated method 150 bypasses block 156 and terminates.

Figure 7B:
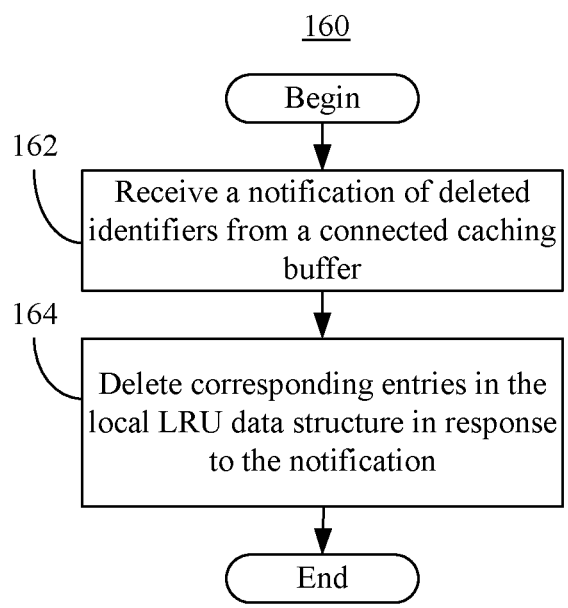
FIG. 7B is a flowchart of an example of a method of supporting memory reclamation in a unified rendering frontend according to an embodiment.

FIG. 7B shows a method 160 of supporting memory reclamation in a unified rendering frontend. The method 160 may generally be implemented in a frontend such as, for example, the unified rendering frontend 66 (FIG. 2), already discussed. More particularly, the method 160 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 162 provides for receiving a notification of deleted identifiers from a connected caching buffer. In an embodiment, block 164 deletes corresponding entries in a local LRU data structure in response to the notification. If the graphics processor pool supports more than one server platform, the local LRU data structure of the frontend may be a subset of the LRU data structure maintained by the backend.

Figure 8:
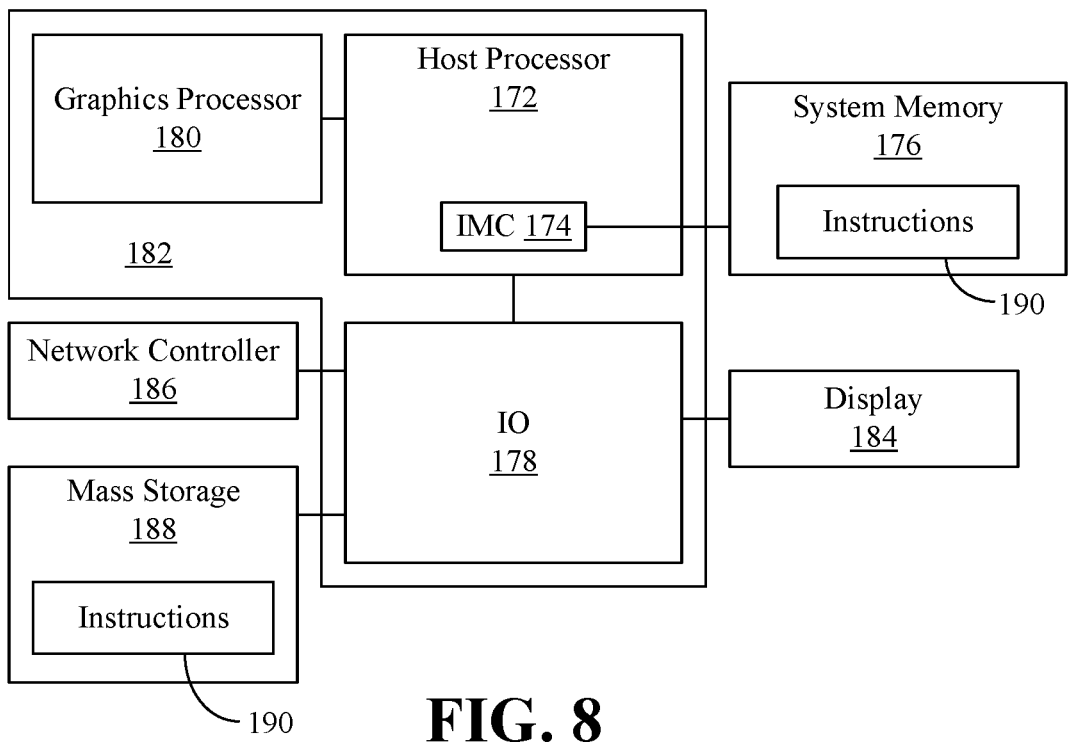
FIG. 8 is a block diagram of an example of a performance-enhanced computing system according to an embodiment.

Turning now to FIG. 8, a performance-enhanced computing system 170 is shown. The system 170 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In an embodiment, the computing system 170 is substituted for the server platform 22 (FIG. 1) and/or the server platform 62 (FIG. 2), already discussed. In another embodiment, the computing system 170 is substituted for the graphics processor pool 30 (FIG. 1) and/or the graphics processor pool 70 (FIG. 2), already discussed.

In the illustrated example, the system 170 includes a host processor 172 (e.g., CPU) having an integrated memory controller (IMC) 174 that is coupled to a system memory 176. The illustrated system 170 also includes an input output (IO) module 178 implemented together with the host processor 172 and a graphics processor 180 on a semiconductor die 182 as a system on chip (SoC). The illustrated IO module 178 communicates with, for example, a display 184 (e.g., touch screen, liquid crystal display/LCD, light emitting diode/LED display), a network controller 186 (e.g., wired and/or wireless), and mass storage 188 (e.g., hard disk drive/HDD, optical disk, solid state drive/SSD, flash memory). In one example, the network controller 186 establishes an IO link (e.g., between a server platform and a graphics processor pool).

In an embodiment, the host processor 172, the graphics processor 180 and/or the IO module 178 execute program instructions 190 retrieved from the system memory 176 and/or the mass storage 188 to perform one or more aspects of the method 80 (FIG. 3), the method 130 (FIG. 6A), the method 140 (FIG. 6B), the method 150 (FIG. 7A) and/or the method 160 (FIG. 7B), already discussed. Thus, execution of the instructions 190 may cause the computing system to send a first message via the IO link, wherein the first message includes a rendering asset and an ID associated with the first rendering asset, exclude a second rendering asset from a second message in response to the ID being shared by the first rendering asset and the second rendering asset, and send the second message via the IO link, wherein the second message includes the ID. The illustrated computing system 170 is therefore performance-enhanced at least to the extent that excluding the second rendering asset from the second message eliminates the transmission of redundant rendering asset data over the IO link and therefore reduces data transmission latency, CPU usage, and/or bandwidth consumption.

Figure 9:
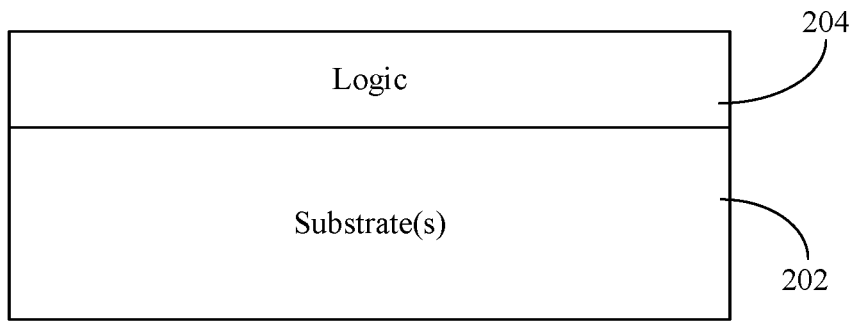
FIG. 9 is an illustration of an example of a semiconductor package apparatus according to an embodiment.

FIG. 9 shows a semiconductor apparatus 200 (e.g., chip, die, package). The illustrated apparatus 200 includes one or more substrates 202 (e.g., silicon, sapphire, gallium arsenide) and logic 204 (e.g., transistor array and other integrated circuit/IC components) coupled to the substrate(s) 202. In an embodiment, the logic 204 implements one or more aspects of the method 80 (FIG. 3), the method 130 (FIG. 6A), the method 140 (FIG. 6B), the method 150 (FIG. 7A) and/or the method 160 (FIG. 7B), already discussed. Thus, the logic 204 may send a first message via an IO link, wherein the first message includes a rendering asset and an ID associated with the first rendering asset, exclude a second rendering asset from a second message in response to the ID being shared by the first rendering asset and the second rendering asset, and send the second message via the IO link, wherein the second message includes the ID. The illustrated apparatus 200 is therefore performance-enhanced at least to the extent that excluding the second rendering asset from the second message eliminates the transmission of redundant rendering asset data over the IO link and therefore reduces data transmission latency, CPU usage, and/or bandwidth consumption.

The logic 204 may be implemented at least partly in configurable logic or fixed-functionality hardware logic. In one example, the logic 204 includes transistor channel regions that are positioned (e.g., embedded) within the substrate(s) 202. Thus, the interface between the logic 204 and the substrate(s) 202 may not be an abrupt junction. The logic 204 may also be considered to include an epitaxial layer that is grown on an initial wafer of the substrate(s) 202.

Figure 10:
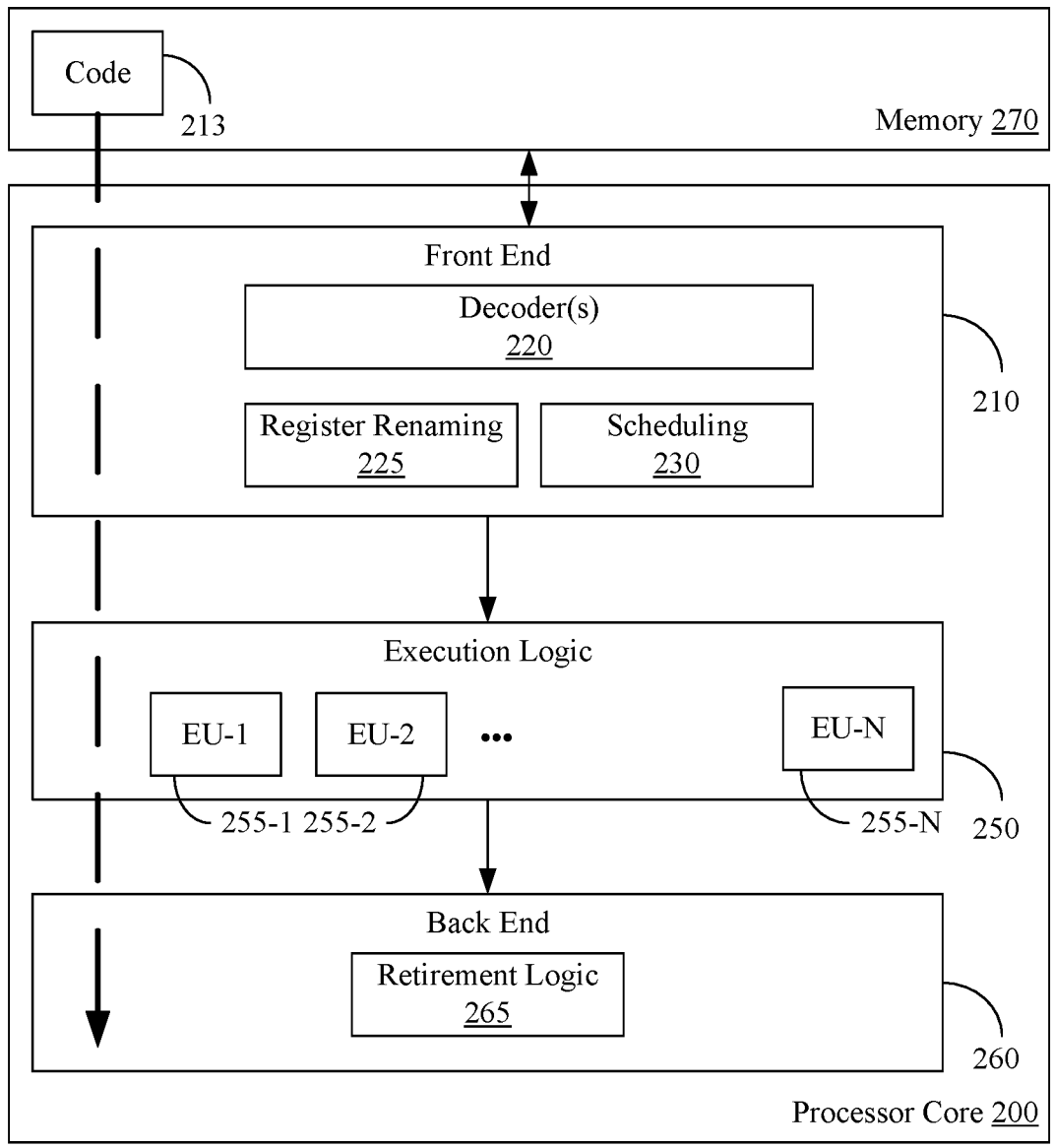
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 80 (FIG. 3), the method 130 (FIG. 6A), the method 140 (FIG. 6B), the method 150 (FIG. 7A) and/or the method 160 (FIG. 7B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 80 (FIG. 3), the method 130 (FIG. 6A), the method 140 (FIG. 6B), the method 150 (FIG. 7A) and/or the method 160 (FIG. 7B), already discussed, and may be similar to the code 213 (FIG. 10), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 includes a performance-enhanced server platform comprising a network controller to establish an input output (IO) link, a processor coupled to the network controller, and a memory coupled to the processor, the memory including a set of executable program instructions, which when executed by the processor, cause the server platform to send a first message via the IO link, wherein the first message includes a first rendering asset and an identifier associated with the first rendering asset, exclude a second rendering asset from a second message in response to the identifier being shared by the first rendering asset and the second rendering asset, and send the second message via the IO link, wherein the second message includes the identifier.

Example 2 includes the server platform of Example 1, wherein the instructions, when executed, cause the server platform to add, in response to receipt of the first rendering asset, the identifier to a head of a least recently used (LRU) data structure, search, in response to receipt of the second rendering asset, the LRU data structure for the identifier to determine whether the identifier is shared by the first rendering asset and the second rendering asset, and move the identifier to the head of the LRU data structure if the identifier is present in the LRU data structure.

Example 3 includes the server platform of Example 1, wherein the instructions, when executed, cause the server platform to apply a hash function to content of the first rendering asset to obtain the identifier, and apply the hash function to content of the second rendering asset to obtain the identifier.

Example 4 includes the server platform of Example 1, wherein the instructions, when executed, cause the server platform to extract the identifier from a first application call associated with the first rendering asset, and extract the identifier from a second application call associated with the second rendering asset.

Example 5 includes the server platform of any one of Examples 1 to 4, wherein the first message and the second message are sent to a remote graphics processor pool via the IO link.

Example 6 includes the server platform of any one of Examples 1 to 4, wherein the first rendering asset is to correspond to a first instance of a graphics application and the second rendering asset is to correspond to a second instance of the graphics application.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to send a first message via an input output (IO) link, wherein the first message includes a first rendering asset and an identifier associated with the first rendering asset, exclude a second rendering asset from a second message in response to the identifier being shared by the first rendering asset and the second rendering asset, and send the second message via the IO link, wherein the second message includes the identifier.

Example 8 includes the semiconductor apparatus of Example 7, wherein the logic coupled to the one or more substrates is to add, in response to receipt of the first rendering asset, the identifier to a head of a least recently used (LRU) data structure, search, in response to receipt of the second rendering asset, the LRU data structure for the identifier to determine whether the identifier is shared by the first rendering asset and the second rendering asset, and move the identifier to the head of the LRU data structure if the identifier is present in the LRU data structure.

Example 9 includes the semiconductor apparatus of Example 7, wherein the logic coupled to the one or more substrates is to apply a hash function to content of the first rendering asset to obtain the identifier, and apply the hash function to content of the second rendering asset to obtain the identifier.

Example 10 includes the semiconductor apparatus of Example 7, wherein the logic coupled to the one or more substrates is to extract the identifier from a first application call associated with the first rendering asset, and extract the identifier from a second application call associated with the second rendering asset.

Example 11 includes the semiconductor apparatus of any one of Examples 7 to 10, wherein the first rendering asset and the second rendering asset include one or more of rendering asset buffer.

Example 12 includes the semiconductor apparatus of any one of Examples 7 to 10, wherein the first rendering asset is to correspond to a first instance of a graphics application and the second rendering asset is to correspond to a second instance of the graphics application.

Example 13 includes at least one computer readable storage medium comprising a set of executable program instructions, which when executed by a computing system, cause the computing system to send a first message via an input output (IO) link, wherein the first message includes a first rendering asset and an identifier associated with the first rendering asset, exclude a second rendering asset from a second message in response to the identifier being shared by the first rendering asset and the second rendering asset, and send the second message via the IO link, wherein the second message includes the identifier.

Example 14 includes the at least one computer readable storage medium of Example 13, wherein the instructions, when executed, cause the computing system to add, in response to receipt of the first rendering asset, the identifier to a head of a least recently used (LRU) data structure, search, in response to receipt of the second rendering asset, the LRU data structure for the identifier to determine whether the identifier is shared by the first rendering asset and the second rendering asset, and move the identifier to the head of the LRU data structure if the identifier is present in the LRU data structure.

Example 15 includes the at least one computer readable storage medium of Example 13, wherein the instructions, when executed, cause the computing system to apply a hash function to content of the first rendering asset to obtain the identifier, and apply the hash function to content of the second rendering asset to obtain the identifier.

Example 16 includes the at least one computer readable storage medium of Example 13, wherein the instructions, when executed, cause the computing system to extract the identifier from a first application call associated with the first rendering asset, and extract the identifier from a second application call associated with the second rendering asset.

Example 17 includes the at least one computer readable storage medium of any one of Examples 13 to 16, wherein the first rendering asset and the second rendering asset include one or more of a rendering asset buffer.

Example 18 includes the at least one computer readable storage medium of any one of Examples 13 to 16, wherein the first rendering asset is to correspond to a first instance of a graphics application and the second rendering asset is to correspond to a second instance of the graphics application.

Example 19 includes a method of operating a performance-enhanced server platform, the method comprising sending a first message via an input output (IO) link, wherein the first message includes a first rendering asset and an identifier associated with the first rendering asset, excluding a second rendering asset from a second message in response to the identifier being shared by the first rendering asset and the second rendering asset, and sending the second message via the TO link, wherein the second message includes the identifier.

Example 20 includes the method of Example 19, further including adding, in response to receipt of the first rendering asset, the identifier to a head of a least recently used (LRU) data structure, searching, in response to receipt of the second rendering asset, the LRU data structure for the identifier to determine whether the identifier is shared by the first rendering asset and the second rendering asset, and moving the identifier to the head of the LRU data structure if the identifier is present in the LRU data structure.

Example 21 includes the method of Example 19, further including applying a hash function to content of the first rendering asset to obtain the identifier, and applying the hash function to content of the second rendering asset to obtain the identifier.

Example 22 includes the method of Example 19, further including extracting the identifier from a first application call associated with the first rendering asset, and extracting the identifier from a second application call associated with the second rendering asset.

Example 23 includes the method of any one of Examples 19 to 22, wherein the first message and the second message are sent to a remote graphics processor pool via the IO link.

Example 24 includes the method of any one of Examples 19 to 22, wherein the first rendering asset corresponds to a first instance of a graphics application and the second rendering asset corresponds to a second instance of the graphics application.

Thus, technology described herein reduces duplicated data transmissions between a CPU and a GPU pool by caching rendering asset resources. Additionally, the technology provides a unified interface for local GPUs and GPU pool solutions. Moreover, the technology reduces CPU usage of servers to support higher density in a single server and reduces the latency introduced by GPU pool architectures. Indeed, the application unaware technology may not require modifications in GPU software stack.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A server platform comprising:
a network controller to establish an input output (IO) link;
a processor coupled to the network controller; and
a memory coupled to the processor, the memory including a set of executable program instructions, which when executed by the processor, cause the server platform to:
send a first message via the IO link, wherein the first message includes a first rendering asset and an identifier associated with the first rendering asset,
exclude a second rendering asset from a second message in response to the identifier being shared by the first rendering asset and the second rendering asset, and
send the second message via the IO link, wherein the second message includes the identifier.

2. The server platform of claim 1, wherein the instructions, when executed, cause the server platform to:
add, in response to receipt of the first rendering asset, the identifier to a head of a least recently used (LRU) data structure,
search, in response to receipt of the second rendering asset, the LRU data structure for the identifier to determine whether the identifier is shared by the first rendering asset and the second rendering asset, and
move the identifier to the head of the LRU data structure if the identifier is present in the LRU data structure.

3. The server platform of claim 1, wherein the instructions, when executed, cause the server platform to:
apply a hash function to content of the first rendering asset to obtain the identifier; and
apply the hash function to content of the second rendering asset to obtain the identifier.

4. The server platform of claim 1, wherein the instructions, when executed, cause the server platform to:
extract the identifier from a first application call associated with the first rendering asset; and
extract the identifier from a second application call associated with the second rendering asset.

5. The server platform of claim 1, wherein the first message and the second message are sent to a remote graphics processor pool via the IO link.

6. The server platform of claim 1, wherein the first rendering asset is to correspond to a first instance of a graphics application and the second rendering asset is to correspond to a second instance of the graphics application.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
send a first message via an input output (IO) link, wherein the first message includes a first rendering asset and an identifier associated with the first rendering asset;
exclude a second rendering asset from a second message in response to the identifier being shared by the first rendering asset and the second rendering asset; and
send the second message via the IO link, wherein the second message includes the identifier.

8. The semiconductor apparatus of claim 7, wherein the logic coupled to the one or more substrates is to:
add, in response to receipt of the first rendering asset, the identifier to a head of a least recently used (LRU) data structure;
search, in response to receipt of the second rendering asset, the LRU data structure for the identifier to determine whether the identifier is shared by the first rendering asset and the second rendering asset; and
move the identifier to the head of the LRU data structure if the identifier is present in the LRU data structure.

9. The semiconductor apparatus of claim 7, wherein the logic coupled to the one or more substrates is to:
apply a hash function to content of the first rendering asset to obtain the identifier; and
apply the hash function to content of the second rendering asset to obtain the identifier.

10. The semiconductor apparatus of claim 7, wherein the logic coupled to the one or more substrates is to:
extract the identifier from a first application call associated with the first rendering asset; and
extract the identifier from a second application call associated with the second rendering asset.

11. The semiconductor apparatus of claim 7, wherein the first rendering asset and the second rendering asset include one or more of a rendering asset buffer.

12. The semiconductor apparatus of claim 7, wherein the first rendering asset is to correspond to a first instance of a graphics application and the second rendering asset is to correspond to a second instance of the graphics application.

13. At least one non-transitory computer readable storage medium comprising a set of executable program instructions, which when executed by a computing system, cause the computing system to:
send a first message via an input output (IO) link, wherein the first message includes a first rendering asset and an identifier associated with the first rendering asset;
exclude a second rendering asset from a second message in response to the identifier being shared by the first rendering asset and the second rendering asset; and
send the second message via the IO link, wherein the second message includes the identifier.

14. The at least one non-transitory computer readable storage medium of claim 13, wherein the instructions, when executed, cause the computing system to:
add, in response to receipt of the first rendering asset, the identifier to a head of a least recently used (LRU) data structure;
search, in response to receipt of the second rendering asset, the LRU data structure for the identifier to determine whether the identifier is shared by the first rendering asset and the second rendering asset; and
move the identifier to the head of the LRU data structure if the identifier is present in the LRU data structure.

15. The at least one non-transitory computer readable storage medium of claim 13, wherein the instructions, when executed, cause the computing system to:
apply a hash function to content of the first rendering asset to obtain the identifier; and
apply the hash function to content of the second rendering asset to obtain the identifier.

16. The at least one non-transitory computer readable storage medium of claim 13, wherein the instructions, when executed, cause the computing system to:
extract the identifier from a first application call associated with the first rendering asset; and
extract the identifier from a second application call associated with the second rendering asset.

17. The at least one non-transitory computer readable storage medium of claim 13, wherein the first rendering asset and the second rendering asset include one or more of a rendering asset buffer.

18. The at least one non-transitory computer readable storage medium of claim 13, wherein the first rendering asset is to correspond to a first instance of a graphics application and the second rendering asset is to correspond to a second instance of the graphics application.

19. A method of operating a performance-enhanced server platform, the method comprising:
sending a first message via an input output (IO) link, wherein the first message includes a first rendering asset and an identifier associated with the first rendering asset;
excluding a second rendering asset from a second message in response to the identifier being shared by the first rendering asset and the second rendering asset; and
sending the second message via the IO link, wherein the second message includes the identifier.

20. The method of claim 19, further including:
adding, in response to receipt of the first rendering asset, the identifier to a head of a least recently used (LRU) data structure;
searching, in response to receipt of the second rendering asset, the LRU data structure for the identifier to determine whether the identifier is shared by the first rendering asset and the second rendering asset; and
moving the identifier to the head of the LRU data structure if the identifier is present in the LRU data structure.

21. The method of claim 19, further including:
applying a hash function to content of the first rendering asset to obtain the identifier; and
applying the hash function to content of the second rendering asset to obtain the identifier.

22. The method of claim 19, further including:
extracting the identifier from a first application call associated with the first rendering asset; and
extracting the identifier from a second application call associated with the second rendering asset.

23. The method of claim 19, wherein the first message and the second message are sent to a remote graphics processor pool via the IO link.

24. The method of claim 19, wherein the first rendering asset corresponds to a first instance of a graphics application and the second rendering asset corresponds to a second instance of the graphics application.

\* \* \* \* \*